Patented June 22, 1954

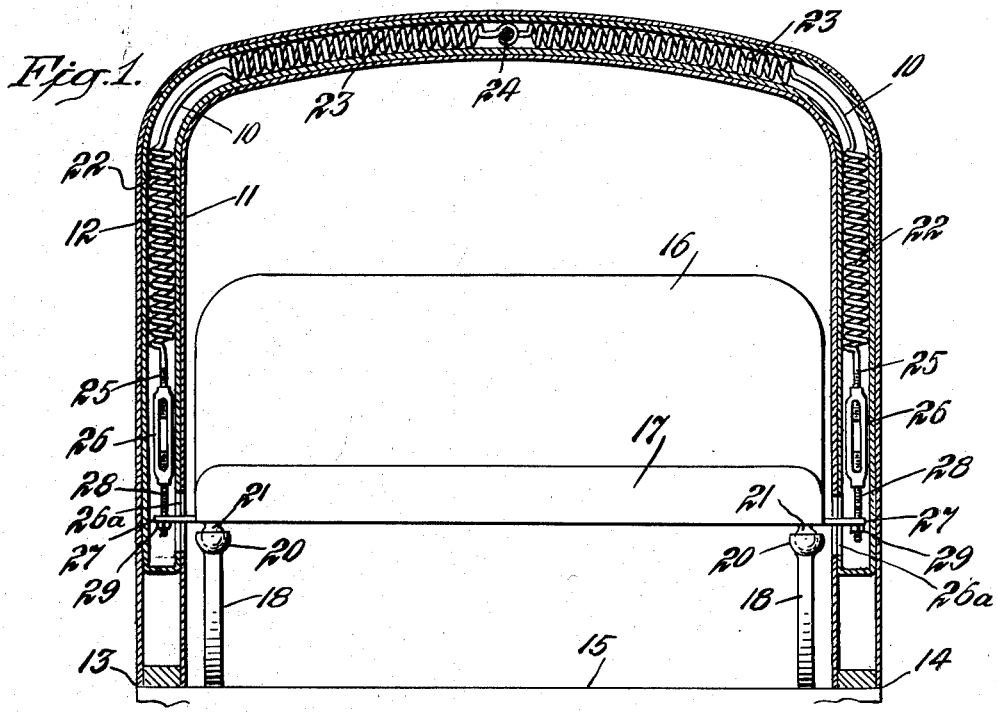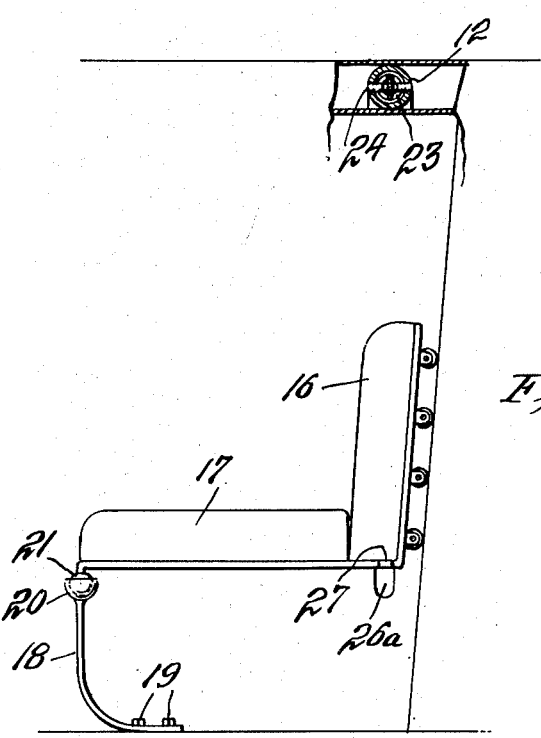

2,681,823

UNITED STATES PATENT OFFICE 2,681,823

RESILIENTLY SUPPORTED AUTOMOBILE SEAT

Henry J. Gaisman, Hartsdale, N. Y.

Application May 26, 1951, Serial No. 228,400

4 Claims. (Cl. 296—63)

My invention relates to a novel form of automobile seat designed to greatly improve the riding qualities of the car and to add to the comfort of passengers. The present seat is distinguished from the conventional form of automobile seat in that it is floating in the sense that it is suspended resiliently in such a manner that the cushioning action in response to riding shocks is absorbed by the seat in its entirety rather than by springs contained within the seat itself.

The object of my invention is to provide means to offset road roughness in riding in a motor car or the like. I provide a floating or semi-floating seat to relieve especially the perpendicular jolting of road roughness, the seat being suspended by springs attached thereto preferably at or near the two rear ends, the springs being secured to the body at a position above the rear of the seat, preferably at the roof of car body. A tube-like channel of firm material of metal or the like secured to the floor and extending in an arc along the sides of the body at a position approximately over the rear of the seat. The tube to contain the springs and hold them along the sides of the car body. The tube having one or more openings, clamps secured at such openings to enable more or less length of the springs to be in use to serve the seat according to the desire of passenger or passengers.

Referring to the drawing it will be observed that a particular embodiment of my invention has been shown for purposes of illustration and that Figure 1 is a front elevation partly in section of my improved seat and mounting construction. Figure 2 is a side elevation of the improved seat also partly in section to show the mounting construction with respect to the top of the car body.

Referring to the drawings, I have shown a hollow tube 10 bent into arch-like form so as to be contained entirely within the inner and outer metal walls 11 and 12 of the car body. Although my invention is illustrated in connection with the rear seat of an automobile, it will be understood that the principles thereof could readily be employed in connection with the front seat. The extremities of the metal tube 10 are secured in any suitable manner at 13 and 14 to the car floor 15, so that the tube is securely positioned in the car body. This tube 10 is disposed around and directly above the back rest 16 of the rear seat 17 as clearly illustrated in Figure 2 of the drawings for a purpose that will be presently apparent.

The front end of the seat 17 is resiliently supported by leaf springs 18 having the lower portion bolted to the floor at 19 and terminating in sockets 20 at the upper portion. It will be apparent that the seat 17 is fulcrumed on the leaf springs 18 through balls 21 seated within the sockets 20.

The rear end of the car seat 17 and attached back rest 16 are resiliently mounted through the mechanism to be presently described. Referring to Figure 1 it will be seen that coil springs 22 and 23 are mounted within the metal tube 10 and have their upper extremities anchored to a pin 24 locked at the top of the tube. The lower portions of the springs 22 and 23 terminate in threaded bolts 25 which are attached to turnbuckles. The inner portions of the tube 10 on either side are formed with openings 26 through which extend the relatively short arms 27 which are mounted at the sides and to the rear of the car seat 17. These arms 27 are formed with openings near the ends for the bolts 28 in the lower ends of the turnbuckles 26 and are adjustably suspended thereon by nuts 29.

As will be readily appreciated, the described arrangement facilitates a semi-floating seat since the springs 22 and 23 constitute the sole means for suspending the rear portion of the seat 17. Accordingly as shocks and bumps are encountered, the rear portion of the seat 17 and the back rest 16 move up and down relative to the car body and are fulcrumed with respect to the balls and sockets 20 and 21 at the front portion of the seat 17. This facilitates an unusually smooth and comfortable riding quality since the seat moves in its entirety in response to motions of the car and the resiliency of the seat is not dependent upon the action of internally mounted springs. It is understood that both the back rest 16 and the seat 17 could likewise be provided with internally mounted springs as desired.

It will be observed that the back of the seat is provided with a plurality of friction-resisting rollers which serve the purpose of facilitating the more easy upward and downward motion of the seat as the same moves in response to shocks encountered during movement of the car and while the seat is cushioned by the coil springs 22 and 23 mounted within the metal tube 10.

I claim:

1. In a car seat including a back rest and a seat portion attached together, the combination of a rigid tube mounted within the car body in an arc extending from the floor on one side of the body through the top above the back rest and down to the floor on the opposite side of the body, a spring secured within said tube extending overhead and substantially throughout the length thereof and means located adjacent thereto for securing the rear portion of the seat to the metal spring so that the back of the seat is resiliently supported thereby.

2. In a car seat including a back rest and a seat portion attached together, the combination of means for pivotally supporting the front portion of the seat, the rear portion of the seat being suspended and supported by springs attached thereto near the rear portion thereof, an arcuate tube for containing the springs disposed above and to the rear of the seat in the frame of the car, said spring extending overhead substantially throughout the length of the tube, the springs being secured to the body at a position above the rear of the seat so that riding shocks are absorbed by said springs as the seat pivots about the point of suspension at the front.

3. In a car seat the combination of a back rest and a seat portion secured together, a rigid tube of substantially arbor-shape construction disposed in the body portion of the car substantially above the back rest, spring means within said tube and extending substantially throughout the length thereof so as to be freely movable therein and secured to the rear of the seat portion at either side thereof from the ends of the tube, a support for the front end of the seat portion arranged in such a manner that the seat is fulcrumed about the front support and moves relative thereto while suspended by the spring means in response to shocks encountered during movement of the car.

4. In a car seat the combination of a back rest and a seat portion secured together, a rigid tube of substantially arbor-shape construction disposed in the body portion of the car substantially above the back rest, spring means within and substantially coextensive therewith said tube so as to be freely movable therein and secured to the rear of the seat portion at either side thereof from the ends of the tube, a support for the front end of the seat portion arranged in such a manner that the seat is fulcrumed about the front support and moves relative thereto while suspended by the spring means in response to shocks encountered during movement of the car, and a series of friction rollers attached to the rear of the back rest to facilitate vertical movement of the seat relative to the surrounding portions of the car body.

References Cited in the file of this patent

UNITED STATES PATENTS

| Number | Name | Date |
|---|---|---|
| 233,761 | Hubbard | Oct. 26, 1880 |
| 2,059,848 | Cavitt | Nov. 3, 1936 |
| 2,110,151 | Hillman | Mar. 8, 1938 |

FOREIGN PATENTS

| Number | Country | Date |
|---|---|---|
| 468,056 | Germany | Nov. 5, 1928 |
| 493,935 | France | May 16, 1919 |
| 522,997 | France | Apr. 12, 1921 |